C. S. ROBISON.
WATER PURIFYING OR SOFTENING SYSTEM.
APPLICATION FILED MAY 27, 1908.
917,139.
Patented Apr. 6, 1909.
2 SHEETS—SHEET 1.
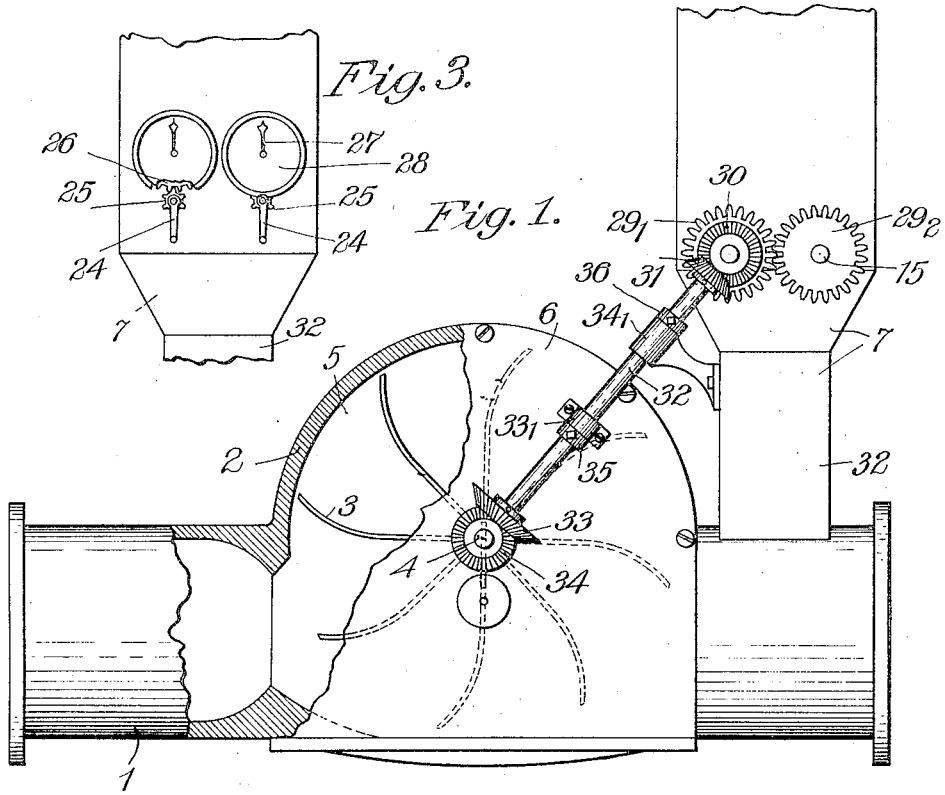
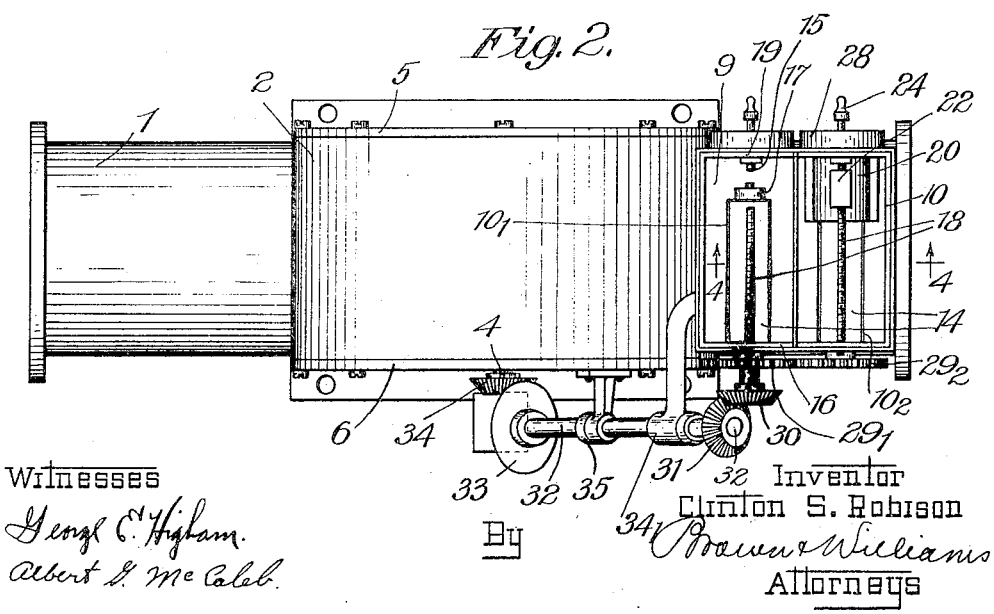

C. S. ROBISON.
WATER PURIFYING OR SOFTENING SYSTEM.
APPLICATION FILED MAY 27, 1908.
917,139.
Patented Apr. 6, 1909.
2 SHEETS—SHEET 2.
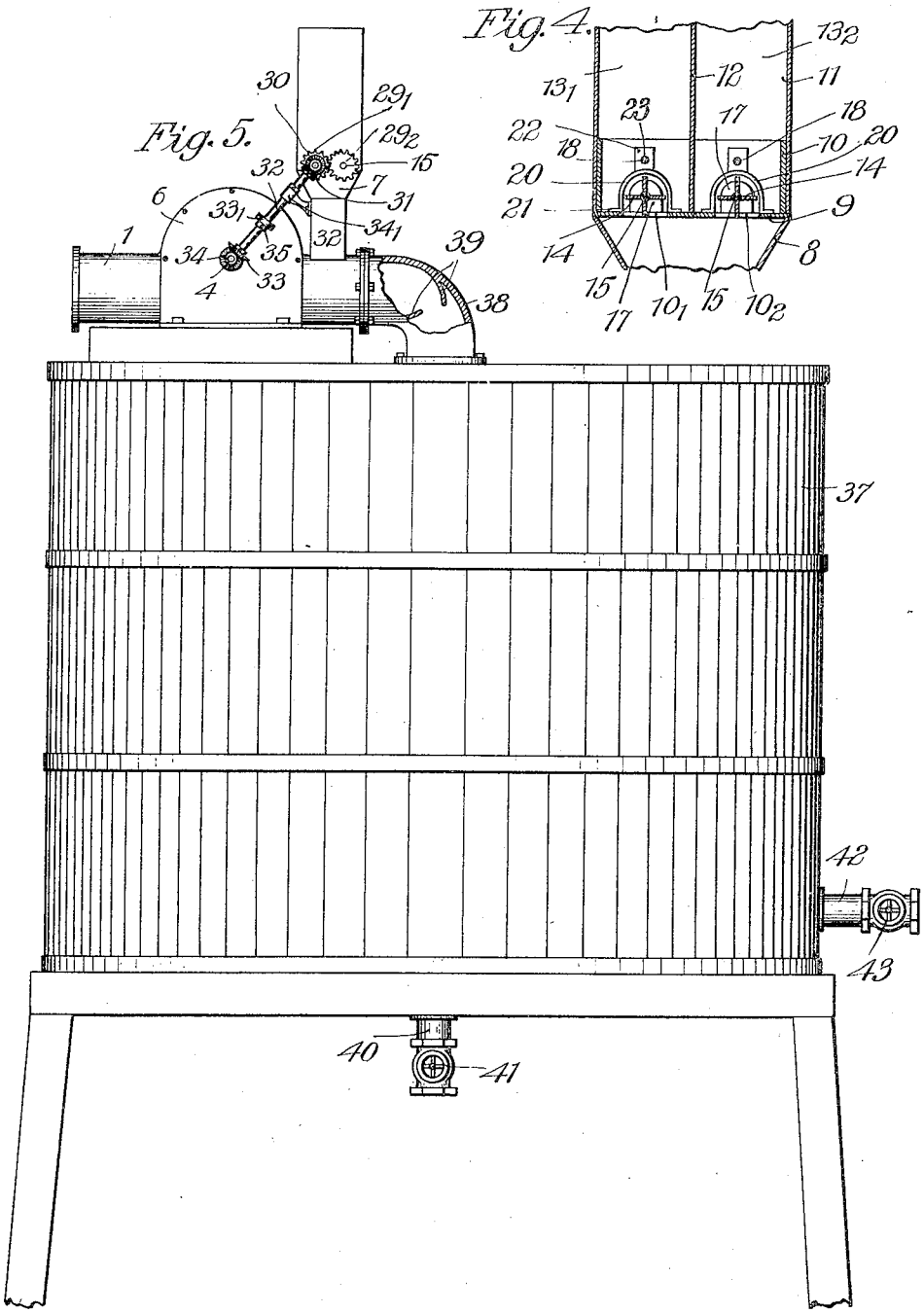
Witnesses
Geng. E. Higham.
Albert G. McCaleb.
Inventor
Clinton S. Robison
By Brown & Williams
Attorneys

UNITED STATES PATENT OFFICE.

CLINTON S. ROBISON, OF CHICAGO, ILLINOIS.

WATER PURIFYING OR SOFTENING SYSTEM.

No. 917,139.　　　Specification of Letters Patent.　　　Patented April 6, 1909.

Application filed May 27, 1908. Serial No. 435,192.

*To all whom it may concern:*

Be it known that I, CLINTON S. ROBISON, a citizen of the United States, residing at Chicago, in the county of Cook and State of Illinois, have invented a certain new and useful Improvement in Water Purifying or Softening Systems, of which the following is a full, clear, concise, and exact description, reference being had to the accompanying drawings, forming a part of this specification.

My invention relates to water purifying or softening systems, being directed particularly to improved arrangement for measuring and feeding chemicals to the water to be softened or purified.

One of the important features of my invention lies in the feeding of the dry chemicals directly to the water to be softened or purified. In prior systems, a solution is first made of the chemicals to be used, which solution is fed at the proper rate to the water to be treated. This involves considerable unnecessary apparatus. In these systems, special provision must be made to attain uniform feed of the solution. Where the solution is fed from a tank, apparatus must be installed to maintain a constant level, as otherwise the proportion of chemical solution fed to the water to be treated will not be correct nor uniform. In my system, the dry chemicals, preferably in a more or less powdered state, are fed directly to the water to be treated, several compartments or hoppers being provided, into which the different chemicals are placed, and a mechanism is provided which is governed by the volume of water flow to measure out and feed these chemicals directly to the water.

Another feature of my invention lies in the mechanism for adjusting the rate of feed of the chemicals. This mechanism is so arranged that the most unskilled laborer can set the feed mechanism in accordance with instructions, which can be of the most simple kind. Dial mechanism is provided which, when turned to a certain position, will result in a certain rate of feed and in a certain proportion of chemical supply to the water. Upon analysis of the water to be treated, the workman is merely notified to move the dial mechanism to a certain indication, whereupon the measuring and feed mechanism is at once properly adjusted to give the correct proportion.

Another feature resides in the means for driving the measuring and feed mechanism in accordance with the volume or rate of flow of the water to be treated. I insert a water wheel in the path of the water flowing to the reservoir from which the source of consumption is fed, this water wheel being connected in driving relation with the measuring and feed mechanism. The supply of chemicals to the water is therefore in exact proportion with the volume of water to be treated. Arrangement is also made to feed the chemicals at or near the water wheel where the water is in more or less commotion and agitation, and baffle webs or extensions are also provided so that the chemicals are thoroughly and uniformly mixed with the water.

In the accompanying drawings, I have shown the various features of my invention applied.

In these drawings, Figure 1 is a side elevation view of a water wheel mechanism and feed mechanism in a preferred arrangement. Fig. 2 is a top view of the same mechanism. Fig. 3 is a side view of a section of the feed mechanism frame showing the adjusting dial mechanism. Fig. 4 is a sectional view taken on line 4—4, Fig. 2. Fig. 5 shows the apparatus of Figs. 1 and 2 mounted on the top of a settling tank. Fig. 6 is a side elevation view showing a somewhat modified arrangement of the feed mechanism and driving parts therefor, and Fig. 7 is a top view of the parts shown in Fig. 6.

1 represents a section of pipe adapted to be inserted in a main supply pipe. This section is modified in construction to form a frame 2 for accommodating a water wheel 3, carried on a shaft 4 which has suitable bearing in the side walls 5 and 6 of the frame. Mounted on the pipe section 1, near the outlet end of the water wheel, is a hopper frame 7 whose detail construction is best shown in Fig. 4. Across the top of the tapered section 8 is a plate 9, in which is a plurality of rectangular openings or passageways $10_1$ and $10_2$, and so on—two such passageways being here shown.

Secured to the plate and extending upwardly therefrom is a rectangular shell or frame 10, which forms a support for telescopingly receiving the lower end of the reservoir frame 11 which has a number of partitions 12 to form compartments $13_1$ and $13_2$ over the passageways $10_1$ and $10_2$. Over each passageway 10, there is a metering or paddle wheel 14 mounted on a shaft 15, having bearing at one end in the front wall 16 of the frame 10 and at the other end having bearing in a lug 17, xtending upwardly from the plate 9 at the rear edge of the corresponding passageway 10, this being best shown in Fig. 2. Above each paddle wheel is an adjusting screw shaft 18, bearing in its front end in the wall 16 and at its rear end bearing in the rear wall of the frame part 10. Over each paddle wheel there is hood-shaped valve 20, readily formed of sheet material, with its lower edges 21 turned out to form feet for engaging the plate 9 adjacent the sides of the corresponding passageway 10. On each valve, there is a lug 22 having a threaded opening 23 for receiving the corresponding screw shaft 18. With this arrangement, turning of the screw shaft will cause the valve to travel along the plate 9 parallel to the corresponding paddle wheel and passageway, the valves being shorter than the paddle wheels. When the feed mechanism has the greatest feeding capacity, the valves will be at one end of the plate 9 to expose the entire passageway 10 to the flow of chemicals which are placed in the reservoir compartments $13_1$ and $13_2$. To decrease the feeding capacity of any passageway, the corresponding screw shaft is turned and the valve carried thereby moved to cover more or less of the corresponding passageway to restrict the flow of the particular chemical. As a means for causing this adjustment, crank handles 24 may be provided suitably pivoted to the outside of the hopper frame, each crank carrying a pinion 25 which meshes with a gear 26 secured to the outer end of the corresponding screw shaft so that turning of the crank will rotate the screw shaft. Also, connected with the end of each screw shaft is an indicating needle 27 which travels over a dial 28 placed concentric with the screw shaft as shown in Fig. 23. It is, of course, evident that any number of reservoir compartments for chemicals may be used with a corresponding number of passageways, paddle wheels and adjusting mechanisms. These various reservoir compartments are filled with the chemicals to be used, and in accordance with analysis made of the water to be treated the workman in charge is instructed to adjust the size of the outlets, he being given a certain combination of dial numbers to which he can cause the indicating needles to be moved by turning the various cranks. There is, therefore, absolutely no skill required to move the feed adjusting parts to the proper position to give the desired proportion of mixture. The paddle wheels and the blades thereof receive the chemicals and assist in carrying them to the passageways and forcing them therethrough at a uniform rate, the blades serving also to disintegrate the chemicals. At the outer end of the paddle wheel shafts are mounted gear wheels $29_1$ and $29_2$, and so on, all connected together so that turning of one will cause turning of the other and one of the paddle wheel shafts is shown as terminating in pinion 30, which gears with a bevel pinion 31 at the end of the oblique shaft 32, which terminates at its other end in a bevel gear 33 meshing with a bevel pinion 34 secured at the end of the water wheel shaft 4. The shaft 32 is shown as journaled in a bearing frame $33_1$ secured to the water wheel casing and bearing frame $34_1$ extending from the hopper frame, the shaft being confined against longitudinal movement by the collars 35 and 36 engaging the outer ends of the bearing frames. As water flows through the pipe section 1, the water wheel is turned and the rotational movement transmitted to the paddle wheel shaft which mounts the pinion 30, and from this by way of gears 29 to all the other paddle wheel shafts. The proper passageway adjustment is made for each chemical and the chemicals fed through the passageways, all passing through the common channel 32 into the pipe section 1 and into the water flowing therethrough. This channel 32 is preferably placed adjacent the outlet of the water wheel where there is considerable commotion and agitation of the water, the chemicals being thus thoroughly mixed with the water and thoroughly dissolved. With this arrangement, the rate of feed of the chemicals is proportional to the rate of rotation of the water wheel, and therefore directly proportional to the volume of water flowing through the pipe section 1, and thus the proportion of water and chemicals continues constant for a certain setting of the feed passageways.

In Fig. 5, the pipe section 1 is connected with the reservoir or settling tank 37 through the elbow 38, and from the walls of this elbow bevel plates or webs 39 extend inwardly into the path of the water, thus causing the water to be further agitated to insure perfect and uniform mixture of the chemicals therewith. At the bottom of the tank is the outflow 40, controlled by the valve 41, through which outflow sediment or settlings may be discharged from the bottom of the tank, while from the outlet 42, controlled by valve 43, connection may be made from the tank with the boiler or other source to be supplied with water.

I claim as follows:

1. In a water softening or purifying system, the combination of a pipe through which water to be treated flows to the place of consumption, a reservoir for chemicals communicating directly with said pipe, there being a valve passageway in said reservoir through which the chemicals flow, a paddle wheel for operating in said passageway to regulate the flow of the chemicals therethrough, a valve for controlling the amount of flow through the passageway, said valve being in the form of a hood disposed over the paddle wheel, a driving shaft for the paddle wheel, a water wheel interposed in the pipe to be driven by the water flow therethrough, and a connection between said water wheel and the paddle wheel shaft whereby said paddle wheel is driven at a rate proportionate to the rate of travel of the water wheel.

2. In a water softening or purifying system, the combination of a pipe through which water to be treated flows to the place of consumption, a reservoir for chemicals communicating directly with said pipe, there being a valve passageway in said reservoir through which the chemicals flow, a paddle wheel for operating in said passageway to regulate the flow of the chemicals therethrough, a valve for controlling the amount of flow through the passageway, said valve being in the form of a hood disposed over the paddle wheel, a driving shaft for the paddle wheel, a water wheel interposed in the pipe to be driven by the water flow therethrough, a connection between said water wheel and the paddle wheel shaft whereby said paddle wheel is driven at a rate proportionate to the rate of travel of the water wheel, a screw shaft having threaded engagement with said valve, a crank for causing rotation of said screw shaft to thereby cause longitudinal movement of the valve to adjust the passageway, and a dial connected with said screw shaft for indicating the valve adjustment.

3. In a water softening or purifying system, the combination of a pipe through which the water to be treated flows to a place of consumption, a reservoir connected directly with the pipe and having a plurality of compartments for containing chemicals, there being a valve passageway in the base of each compartment, a paddle wheel in each compartment for regulating the flow of chemicals through the valve passageway, a shaft for each paddle wheel, said shafts being connected together to be driven in unison, a water wheel interposed in said pipe and connected with said shafts to cause rotation of the paddle wheels at a rate proportionate to the rate of rotation of the water-wheel, a valve in each compartment adapted to be moved longitudinally over the valve passageway to adjust the size of said passageway, means at the exterior of each compartment for controlling the adjustment of the valve within the compartment, and a dial for each valve for indicating its adjustment.

4. In a water softening or purifying system, the combination of a pipe through which the water to be treated flows to a place of consumption, a reservoir connected directly with the pipe and having a plurality of compartments for containing chemicals, there being a valve passageway in the base of each compartment, a paddle wheel in each compartment for regulating the flow of chemicals through the valve passageway, a shaft for each paddle wheel, said shafts being connected together to be driven in unison, a water wheel interposed in said pipe and connected with said shafts to cause rotation of the paddle wheels at a rate proportionate to the rate of rotation of the water wheel, a valve in each compartment adapted to be moved longitudinally over the valve passageway to adjust the size of said passageway, a screw shaft for each compartment having threaded engagement with said valve so that turning of the screw shaft will cause longitudinal movement of said valve to adjust said passageway, a gear at the end of each screw shaft, an indicator connected with each screw shaft for indicating the adjustment of the valve, a crank associated with each gear, and a pinion connecting each crank with the associated gear, turning of the crank causing rotation of the associated screw shaft and adjustment of the corresponding valve.

In witness whereof, I have hereunto subscribed my name this 25th day of May, A. D. 1908.

CLINTON S. ROBISON.

Witnesses:
   CHAS. H. ROBISON,
   CHARLES J. SCHMIDT.